United States Patent
Musil et al.

(10) Patent No.: US 7,165,293 B2
(45) Date of Patent: *Jan. 23, 2007

(54) CONVEYOR BELT FASTENERS

(75) Inventors: Edward C. Musil, Orland Park, IL (US); Richard B. Reynolds, Naperville, IL (US); John H. Winkelman, Naperville, IL (US); Jorge Carlos Peña Basulto, Santiago (CL); André Ribeiro Daltro-Santos, Rid de Janeiro (BR)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/246,505

(22) Filed: Oct. 7, 2005

(65) Prior Publication Data

US 2006/0026802 A1    Feb. 9, 2006

Related U.S. Application Data

(63) Continuation of application No. 10/382,996, filed on Mar. 4, 2003, now Pat. No. 7,007,349.

(60) Provisional application No. 60/361,482, filed on Mar. 4, 2002.

(51) Int. Cl.
*F16G 3/08*    (2006.01)

(52) U.S. Cl. ........................................ 24/37; 198/844.2

(58) Field of Classification Search ................ 198/818, 198/819, 823–830, 844.2; 24/37, 38, 31 B, 24/31 V
See application file for complete search history.

(56) References Cited

U.S. PATENT DOCUMENTS

| 471,285 A | 3/1892 | Whiting |
| 1,485,950 A | 3/1924 | Biedermann |
| 1,659,001 A | 2/1928 | Purple |
| 2,490,195 A | 12/1949 | Beach |
| 3,008,207 A | 11/1961 | Palow |
| 3,093,005 A | 6/1963 | Dean |
| 3,141,346 A | 7/1964 | Dean |
| 3,737,954 A | 6/1973 | Tabler |
| 3,854,574 A | 12/1974 | Theijsmeijer et al. |
| 4,212,094 A | 7/1980 | Pray |
| 4,315,349 A | 2/1982 | Stolz |
| 4,558,492 A | 12/1985 | Hite et al. |
| 4,671,403 A | 6/1987 | Schick |

(Continued)

FOREIGN PATENT DOCUMENTS

DE    826723    1/1952

(Continued)

*Primary Examiner*—James R. Brittain
(74) *Attorney, Agent, or Firm*—Fitch, Even, Tabin & Flannery

(57) ABSTRACT

A rubberized conveyor belt fastener is provided including a plate portion and elastomeric material that extends beyond lateral sides of the plate so that gaps between adjacent plate portions in a conveyor belt splice can be minimized. The plate portions can also include elastomeric material extending over the upper surface thereof to better absorb impact forces therewith. Preferably, the elastomeric material connects a strip of plates together. Both upper and lower plates can be provided with elastomeric material with the lower plates of solid plate fasteners having bolts preassembled thereto deriving the additional benefit of utilizing the elastomeric material to hold the bolt head in its lower plate aperture.

16 Claims, 6 Drawing Sheets

U.S. PATENT DOCUMENTS

| | | |
|---|---|---|
| 5,236,079 A | 8/1993 | Herold |
| 5,341,545 A | 8/1994 | Herold |
| 5,599,131 A | 2/1997 | Julen et al. |
| 5,890,266 A | 4/1999 | Herold |
| 6,170,128 B1 | 1/2001 | Börner et al. |
| 6,250,450 B1 | 6/2001 | Howard |
| 6,345,925 B1 | 2/2002 | Coleman |

FOREIGN PATENT DOCUMENTS

| | | |
|---|---|---|
| DE | 37 09 594 C1 | 7/1988 |
| DE | 42 35 759 A1 | 5/1994 |

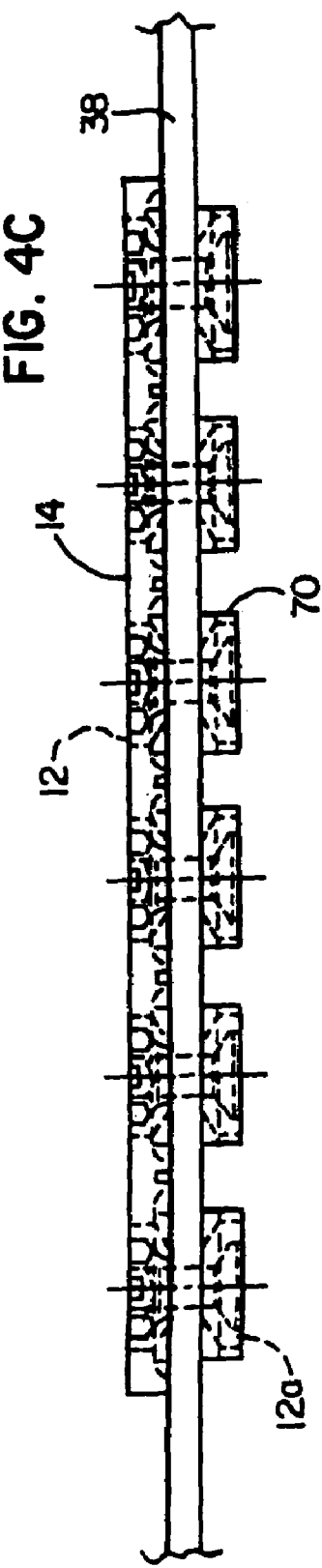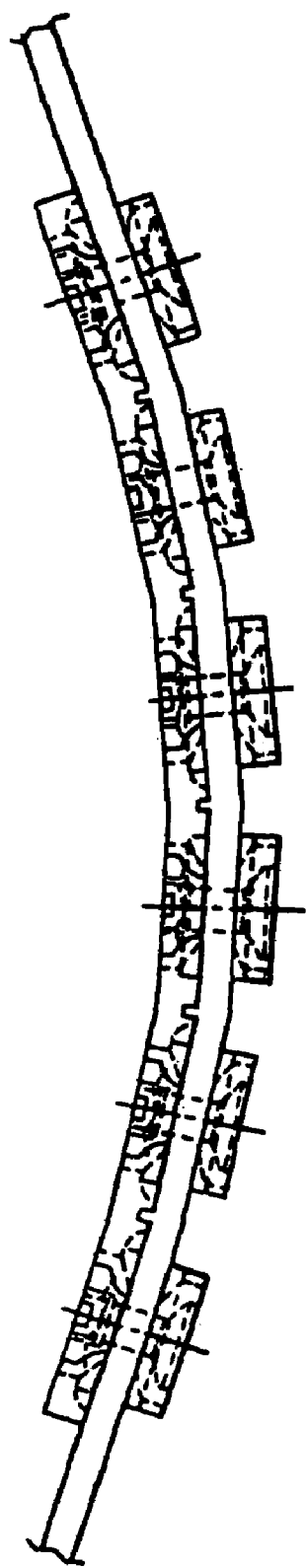

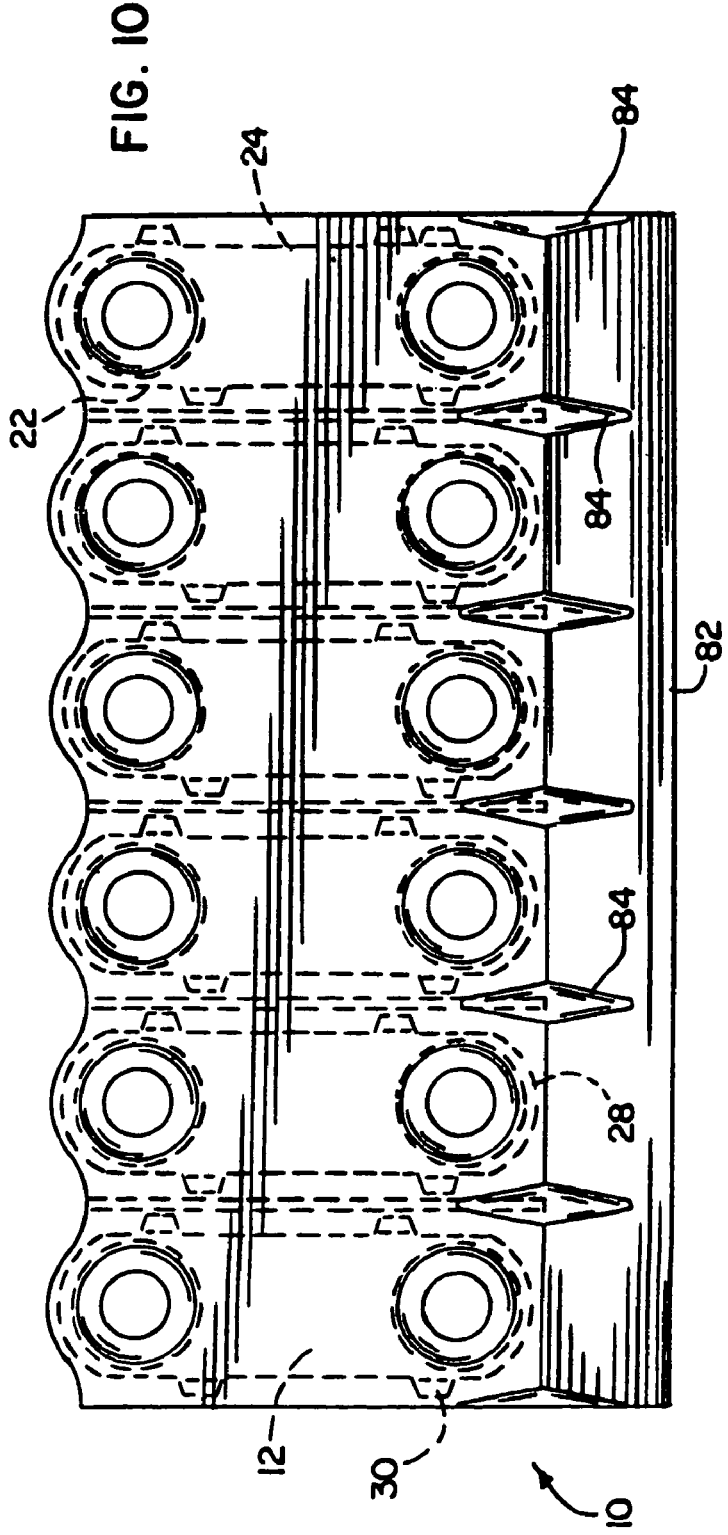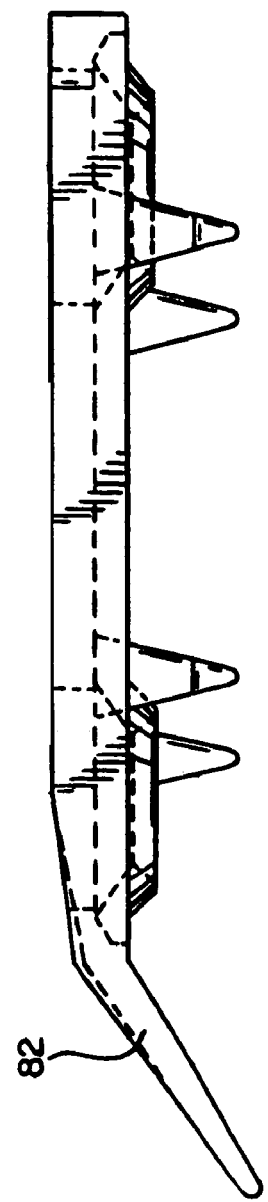

CONVEYOR BELT FASTENERS

CROSS-REFERENCE TO RELATED APPLICATION

This application is a continuation of prior application Ser. No. 10/382,996, filed Mar. 4, 2003 now U.S. Pat. No. 7,007,349, which claims the benefit under 35 U.S.C. § 119 of prior provisional application No. 60/361,482, filed Mar. 4, 2002.

FIELD OF THE INVENTION

The present invention relates to fasteners for splicing conveyor belt together and, more specifically, to conveyor belt fasteners having rubber associated therewith.

BACKGROUND OF THE INVENTION

For splicing ends of conveyor belts together, metal belt fasteners are commonly employed that are secured to the belt ends as by various types of attachment members such as staples, bolts, rivets, and the like. The metal fasteners can be either of the hinged variety wherein they include plates attached onto one belt end and having loops projecting from the belt end that mate with loops of hinge fasteners attached on the other belt end for receiving a hinge pin therethrough, or can be of the solid plate variety where the fasteners span the belt ends for being attached thereto and thus do not employ a hinge pin. In either instance, the metallic fasteners provide distinct splice points along the run of the conveyor belt system where conveyor components that engage the belt surfaces such as belt cleaners, rollers and the conveyed material itself chute fed onto the belt will impact a harder material than that of the belt material that they otherwise would normally engage. These impacts cause abrasion and wear of these engaging components and can lead to unsatisfactory performance and their premature failure, and can also generate environmental problems such as where the conveyed material, e.g. rocks, coal, sand, etc., is broken up into fine air-borne particles by being dropped onto the metallic splice.

Most conveyor belts have an elastomeric or PVC-type material in which carcass material is embedded for strength purposes so that the conveyor belt covers against which, for example, blades of the belt cleaners are biased for scraping their surfaces clean will transition at the splice from engaging the softer rubber or PVC belt covers to the harder metallic material of the splice fasteners. This engagement with the metallic splices can induce vibrations in the cleaner blade generating a condition called "chattering" of the cleaner which can cause excessive damage to the conveyor belts. Accordingly, there is a need for a conveyor belt fastener that reduces the deleterious effects of high impact forces with metallic splices in terms of excessive wear of conveyor components such as the above-described belt chattering problems and the environmental problems that can be caused by impacts of the conveyed material with the splice.

Another problem with the typical belt fasteners is the gap spacing provided between the distinct fasteners along a particular splice. These gaps provide spaces for material such as aggregate rock material to sift between the fasteners and below to the interface between the rollers and the lower surface of the conveyor belts as well as to the other drive mechanisms under the belt. Also, conveyed material can get stuck in these gaps where belt cleaners cannot reach the material such that it is carried back on the return run of the conveyor. With solid plate fasteners, the fasteners are typically individually applied to the belt ends via a template that provides them with an optimum spacing between each other so that the belt can trough at a desired angle along the sides thereof to keep the material on the belt from falling off the sides, as is known. Further, the spacing is selected so that the holes through the belt for the attachment members, e.g. such as bolts for the solid plate fasteners, are not so frequent so as to damage the belt integrity and create undue weakness therein. Accordingly, there is a need for a belt fastener that allows for belt troughing while still minimizing sifting and carry back of conveyed material between adjacent plates along a splice formed by the fasteners.

For the high force impact problem such as manifested in one example by blade chattering, applicants' assignee herein has employed a solid plate fasteners having individual upper plates thereof having a thin coat of an elastomeric material thereon. While this fastener is likely to better absorb the forces of impact between, for instance, the cleaner and the belt splice formed with these fasteners, they do little to address the sifting problem created by the gaps left between adjacent plates attached along the belt ends in the splice. Another shortcoming is the time needed to clean flashing from those plates having thin rubber coatings individually molded thereon.

U.S. Pat. No. 5,839,571 discloses a belt joining device having a general H-shape with two pairs of opposing flanges that are to be secured onto the respective belt ends for splicing the belts together via small embedded grommetted inserts for receiving attachment members that extend through the belt. This joining device generally uses conveyor belt-type material including rubber material having carcass reinforcement cables arranged in a pattern embedded in the material. Like a conveyor belt, it is these reinforcement cables that provide the H-joining device its strength, and thus the flanges generally are fairly thick to accommodate the cables extending therein for strength purposes and therefore are of a higher profile than desired.

Accordingly, while the joining device of the '571 patent accommodates troughing of the conveyor belt, it has been found that in practice it generates excessive chatter of the cleaning blade producing damage to the conveyor belt adjacent splice. The high profile creates high force impacts with the blade cleaner that tend to damage the joining device decreasing the life of the splice more rapidly than is desired. With the damage to the belt caused by the chatter of the blade adjacent to the splice, when the splice fails, the splice installer has to take out a greater amount of the belt including the adjacent damaged portion thereof for forming the new splice. In many conveyor belt systems, there is insufficient belt length on the take-up portion of the system to allow for splicing by removing these large portions of the belt at the damaged splice. Moreover, it has been found that in high tension applications, the joining device is more likely to fail as the rubber material thereof stretches. With multiple rows of attachment members, the row closest to the belt end sees most of the loading and once it fails, either the joining device will catastrophically fail along that attachment row or the remaining rows of attachment members also begin to fail.

Accordingly, a conveyor belt fastener that reduces the force of impacts of conveyor system components including cleaner blades as well as conveyed material therewith and chatter of the blades along the conveyor belt and damage to the belt would be desired. Further, and as mentioned, the belt fastener preferably minimizes sifting and carry back of material on the belt to areas therebelow while still enabling conveyor belt troughing.

SUMMARY OF THE INVENTION

In accordance with the present invention, a conveyor belt fastener having a plate portion and elastomeric material associated therewith is provided where the elastomeric or rubber material extends beyond lateral sides of the plate to enable the fasteners to be applied to belt ends in closely spaced or abutting side-to-side relation with each other along the splice formed therewith. In this manner, the present belt fastener minimizes gaps between adjacent fasteners in a splice that would otherwise provide for spaces through which conveyed material could be trapped and/or sift down under the conveyor belts onto the rollers of the conveyor system and drive mechanisms associated therewith. Further, because of the extending rubber lateral portions, adjacent fasteners can take on other than a planar orientation relative to each other as may be necessary when the conveyor belt is troughed along its upper run as by upward inclination of the conveyor belt sides to keep conveyed material from falling off the sides of the belt.

It is preferred that the elastomeric material forming the lateral portions also extend over the top of the plate portion of the fastener so that when conveyed material is fed onto the belt and components of the conveyor system that are engaged with the belt surfaces such as cleaner blades encounter the splices, the impact forces with the fasteners in the splice are absorbed by the softer, resilient elastomeric material covering the metallic material plate portion, reducing damaging impacts to the plate itself and the tendency for the impact to generate chattering of the blade along the belt surface. Further, the environmental problems associated with the impacts of conveyed materials with the fastener should be minimized. Thus, the present rubber-coated fastener provides anti-sifting capabilities while still allowing troughing of the conveyor belts. With the fastener having rubber-coated plates, the life of the fasteners and other conveyor components that impact thereagainst will be increased and damage to the conveyor belt caused by chattering of the belt cleaner blade therealong will be reduced.

The preferred conveyor belt fasteners described herein are solid plate fasteners having upper plates and distinct or separate lower plates with the upper plates being rubber-coated as described above. However, it will be recognized that other fastener configurations are also contemplated such as the previously described hinged-type fasteners having a plate portion with loops projecting therefrom. In this instance, the rubber coating extends over the plate portion with the loops preferably uncoated with any elastomeric material.

As is apparent, the strength of the splice of the present rubber-coated fasteners is mainly derived from the strength of the metallic fastener plate portion akin to present commercially available metallic belt fasteners having plate portions such as the solid or hinged type fasteners previously described. Thus, the present rubber-coated fasteners are well-suited to high tension applications. Further, the anti-sifting and anti-carryback features provided by the lateral portions that extend laterally beyond the sides of the plate as described above enable the plates to be positioned along the end of the belt in the same manner as the non-coated plate fasteners. In other words, the spacing of the present plate fasteners can be set with the identical templates used with the corresponding non-coated plate fasteners provided by the assignee herein, thereby not reducing the strength of the conveyor belt material as by having too many closely spaced through holes formed therein for receipt of the attachment members or bolts therethrough.

In a preferred form of the invention, the elastomeric material connects a plurality of plates together so that the rubber-coated fastener plates are provided in a strip thereof. The rubber-coated strip of fastener plates significantly eases installation, particularly of the solid plate type of fasteners as these are normally separate from each other unlike most hinged fasteners that have bridge portions extending therebetween. Instead of having to pull out individual upper plates from a box or bucket of such plates for placing on the protruding ends of bolts extending through the belt and above the upper surface thereof, an entire rubber-coated strip can be removed with several plates placed simultaneously over the ends of the bolt members. Accordingly, the rubber-coated strip of fastener plates is much easier to handle and does not require as much time to install. Further, where the lateral portions of the elastomeric material are in the form of connecting portions that extend between adjacent plates and which allow the plates to resiliently flex relative to each other acting as hinges therebetween during troughing of the conveyor belt, there are no gaps between the plates through which conveyed material can sift.

In one form, the strip of the fastener plates are of the solid plate-type fasteners so that there are upper and lower plates that are separate from each other, unlike the upper and lower plates joined by loops in the hinged fasteners. In this regard, the plates that are flexibly connected by the elastomeric connecting portions are the upper plates.

As mentioned, with these types of solid plate fasteners, the lower plates are positioned via a template to achieve the proper spacing of the plate fasteners along the splice to provide good holding power while minimizing the number of through holes formed in the belt end. The attachment members of these plate fasteners which preferably are bolts generally are preassembled to the lower plates to reduce installation time as by clips or washers held on the bolt shank such as disclosed in applicants' Assignee's U.S. Pat. No. 5,599,131. However, the clips or washers require special preassembly steps and equipment therefor that is rather costly to man and operate.

Accordingly, the present invention also contemplates the use of elastic material in apertures of lower plates in which the attachment members are to extend. More particularly, with the bolt form of the attachment members, the bolts will have an enlarged head that seats in the lower plate aperture, and the elastic material secures the head therein. In this manner, the use of clips or washers and the associated assembly expense therewith is avoided. Instead, like the strip of upper plates, several lower plates and associated bolt attachment members can be molded with the elastomeric material in situ, avoiding the need for specialized equipments associated with preassembly of the washers, for example. Also, the elastomeric material can also be coated on the surface of the lower plates facing toward the rollers to provide less wear thereon and quieter conveyor operations. To this end, the lower plates can also be provided with elastomeric connecting portions so that they are molded and attached in strip form like the upper plates to reduce installation time. The lateral plate spacing in the strip is preset to the desired spacing between the plates along the belt ends.

BRIEF DESCRIPTION OF THE DRAWINGS

FIGS. 4A–4D show both strips and individual rubberized plates attached onto conveyor belts having both flat and troughed configurations thereof;

FIG. 10 is a plan view of a strip of rubberized upper plates showing a tapered lead-in portion; and FIG. 11 is an enlarged elevational view of one of the end plates of the strip of FIG. 10.

DETAILED DESCRIPTION OF THE PREFERRED EMBODIMENTS

Figure 1:
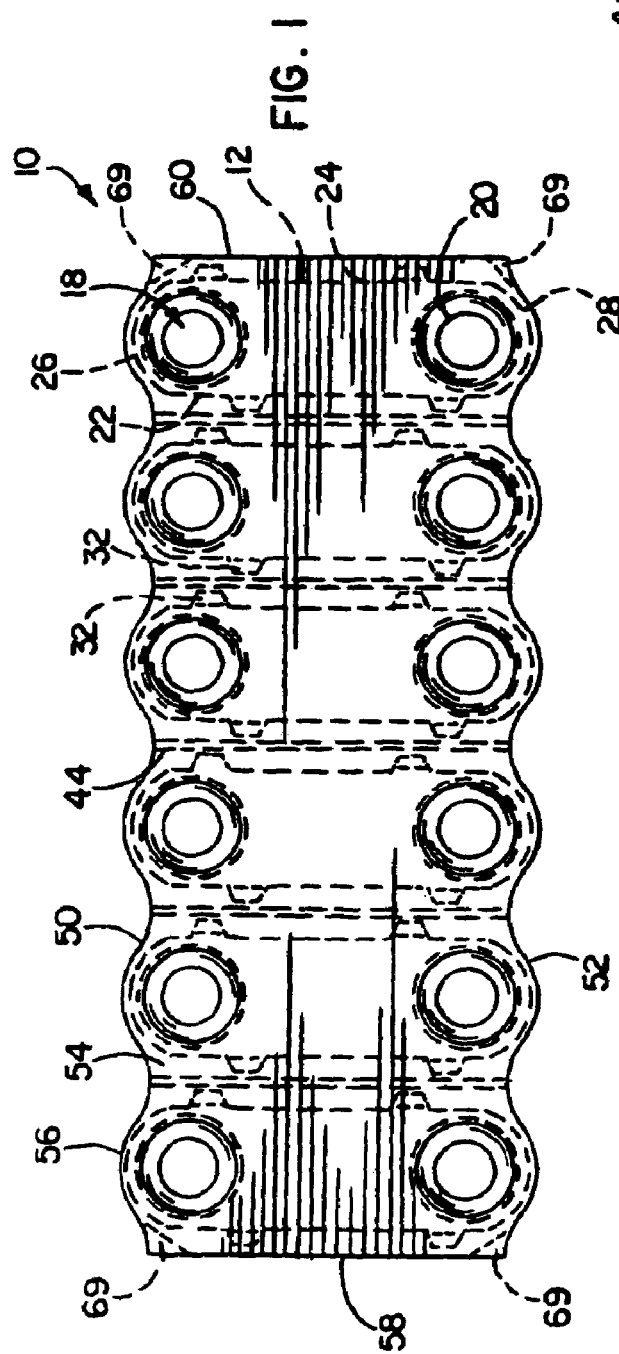
FIG. 1 is a plan view of a strip of connected upper plates of a conveyor belt fastener in accordance with the present invention showing elastomeric material covering the plates and extending therebetween and having scalloped leading and trailing edges.
Figure 2:
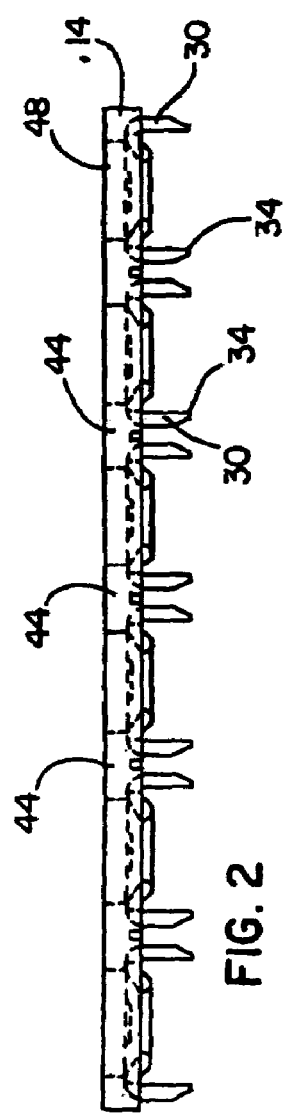
FIG. 2 is an end elevation view of the strip of fastener plates of FIG. 1 showing the thickness of the layer of elastomeric material interconnecting the plates and teeth depending from the plates.

In FIGS. 1 and 2, a strip 10 of fastener plates 12 is shown that are interconnected by, and preferably coated with, an elastomeric material 14 in accordance with the present invention. As has been noted, while the preferred and illustrated conveyor belt fasteners are of the solid plate variety, it is manifest that other belt fastener configurations could also be employed in accordance with the present invention. Accordingly, the illustrated plates 12 are upper plates in the solid plate fastener 16, such as the prior solid plate fastener shown in FIGS. 5–7. Such a plate fastener is commercially available from the assignee in their Bolt Solid Plate Fastener System line of products and is described in applicants' assignee's U.S. Pat. Nos. 5,559,131 and 6,293,302, which are incorporated by reference herein. Accordingly, the rubber coated fastener plates 12 herein are able to be utilized in the same manner from a load bearing or PIW (pounds-per-inch of belt width) strength rating perspective as the prior noncoated solid plate fasteners including in medium and heavy-duty applications. Further, the plates 12 could also be lower plates in the solid plate fastener 16 that are coated with the elastomeric material 14 (FIGS. 4A–4D), as will be described more fully hereinafter.

Returning to FIGS. 1 and 2, the plates 12 have a length and a width and have recessed apertures 18 and 20 formed at either end thereof along their length. As illustrated, the plates 12 each include a single aperture 18, 20 at their respective ends for being aligned to receive an attachment member that extends through a conveyor belt, although larger plates having greater numbers of apertures could also be employed. The plates 12 have opposite sides 22 and 24 that generally extend parallel to each other along the plate length and are spaced from each other along the plate width. The sides 22 and 24 are interconnected by curved ends 26 and 28 of the plates 12.

The plates 12 are provided with teeth 30 that depend from the plate sides 22 and 24. As shown, a pair of teeth 30 are adjacent plate end 26, and a pair of teeth 30 are adjacent to plate end 28 with each pair being offset from each other in the lengthwise direction of the plate 12. The teeth 30 are bent from the plates 12 so that they have an upper portion 32 that projects beyond their respective plate sides 22 or 24. The teeth 30 extend from the upper portion 32 down to tapered ends 34 that come to a point for piercing the conveyor belt 36 when the fasteners 16 are secured to the end portions 38 thereof.

Figure 5:
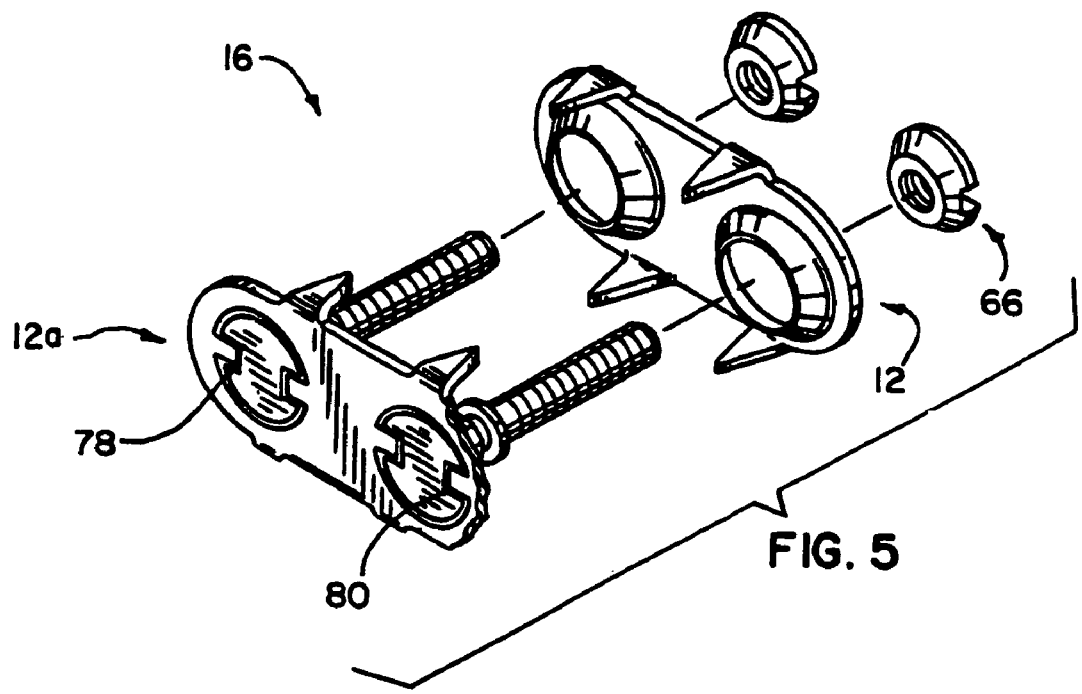
FIG. 5 is a perspective view of a prior solid plate fastener showing upper and lower plates thereof and bolts preassembled to the lower plates.
Figure 6:
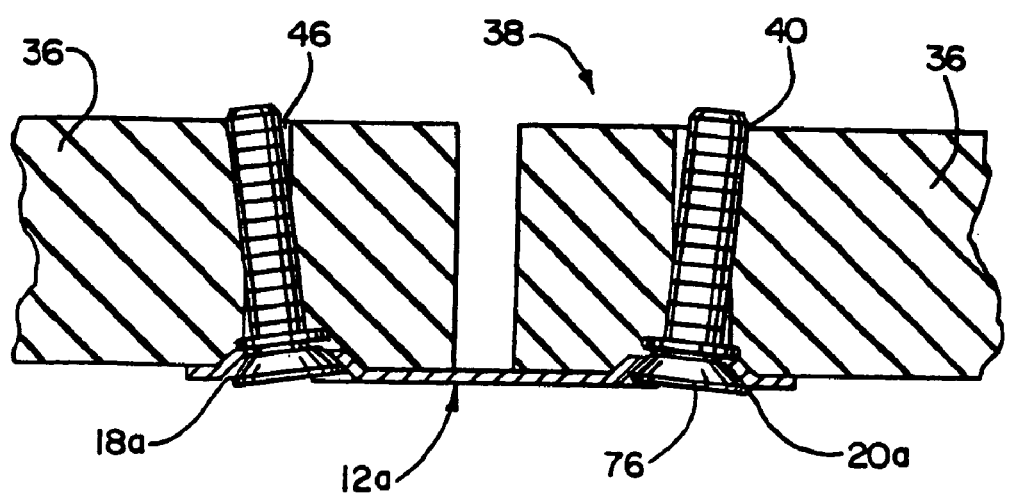
FIG. 6 is an end elevation view of one of the prior lower plates and preassembled bolts with shanks of the bolts extending in through openings formed in adjacent belt ends to be spliced together.
Figure 7:
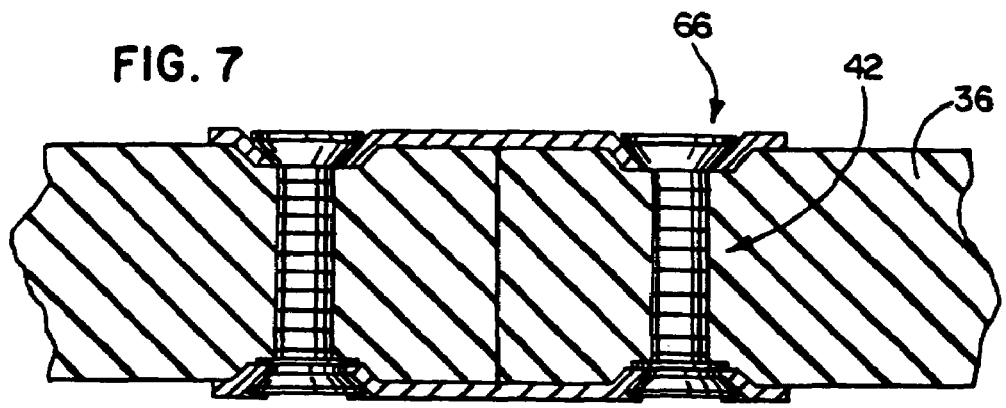
FIG. 7 is a view similar to FIG. 6 showing a prior upper plate placed on the upper surfaces of the belt ends with protruding bolt ends extending in the apertures of the upper plate and nuts tightened thereon to draw the belt ends together.
Figure 8:
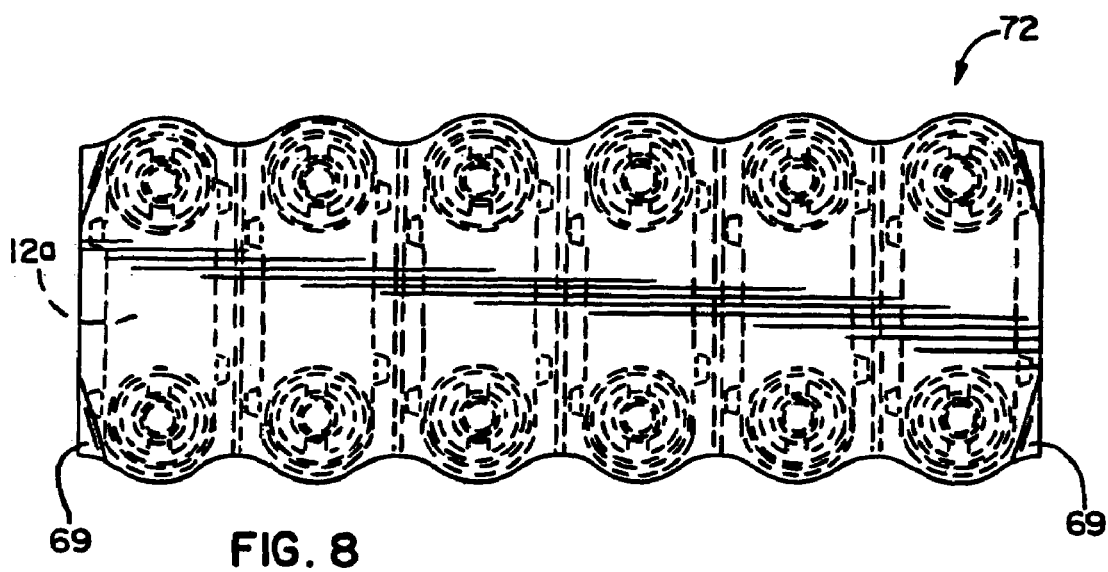
FIGS. 8 and 9 are plan and elevational views of a strip of rubberized lower plates similar to those shown in FIGS. 4A and 4B having bolts preassembled thereto.
Figure 9:
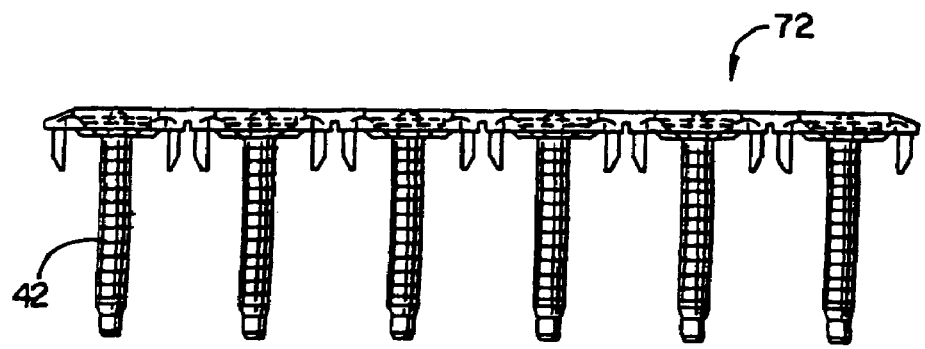

It is preferred that the plates 12 be flexibly connected together via the elastomeric material 14 as by molding of the elastomeric material 14 to a predetermined number of the plates 12 (herein shown as a strip 10 of six plates 12). The in situ molding of the plurality of the upper plates 12 together so that they have a layer of elastomeric material 14 extending thereon and along the strip 10 provides for several distinct advantages over, for example, prior conveyor belt fasteners such as shown in FIGS. 5–7. In particular, since the upper plates 12 are no longer separate, handling and application procedures become easier and faster. With the present rubber coated conveyor belt fastener plate strip 10, the installer can simultaneously place a number of plates 12 into position so that protruding ends 40 of attachment members in the form of bolts 42 are received in the apertures 18 and 20. Thus, the installer does not have to handle separate plates and individually position them onto the belt so that the bolt ends 40 are located in the apertures of the plates.

Another significant advantage is in having lateral portions 44 of the elastomeric material 14 that extend laterally in the widthwise direction of the plates 12 beyond the sides thereof by a predetermined amount, preferably beyond the teeth 30, e.g. 0.07 inch rubber extension past the teeth 30 where dimensions are 1.035 inches across the teeth 30 on either side of the plate 12 and 0.815 inch across the sides of the plate 12 itself, so as to provide the rubber-coated fasteners herein and particularly the rubber-coated strip 10 of fastener upper plates 12 with improved anti-sifting and anti-carryback capabilities. In this regard, it is noted that the lateral portions 44 are integrally connected with lateral portions 44 of adjacent plates 12 in the strip 10 so as to form elastomeric connecting portions therebetween, as shown in FIGS. 1 and 2. However, it is to be recognized that the laterally extending portions 44 with individual plates 12 that are not in strip form are still advantageously employed for anti-sifting purposes and anti-carryback in that they can be closely spaced or abutted against the laterally extending elastomeric material portions 44 of adjacent plates 12 in a splice so as to minimize the gaps therebetween through which conveyed material may be trapped and/or sift down to the rollers and other operating components of the conveyor belt system.

Figure 4A:
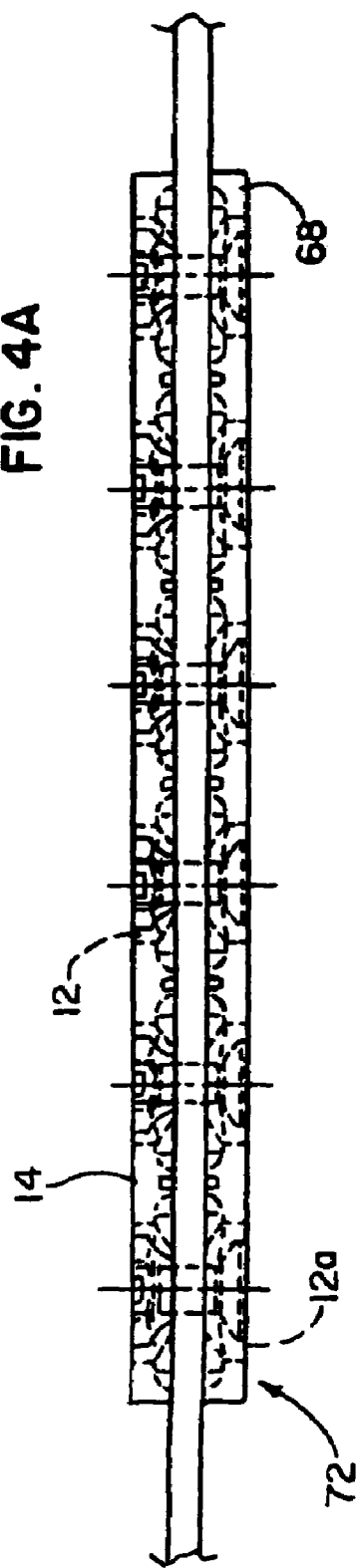
Figure 4B:
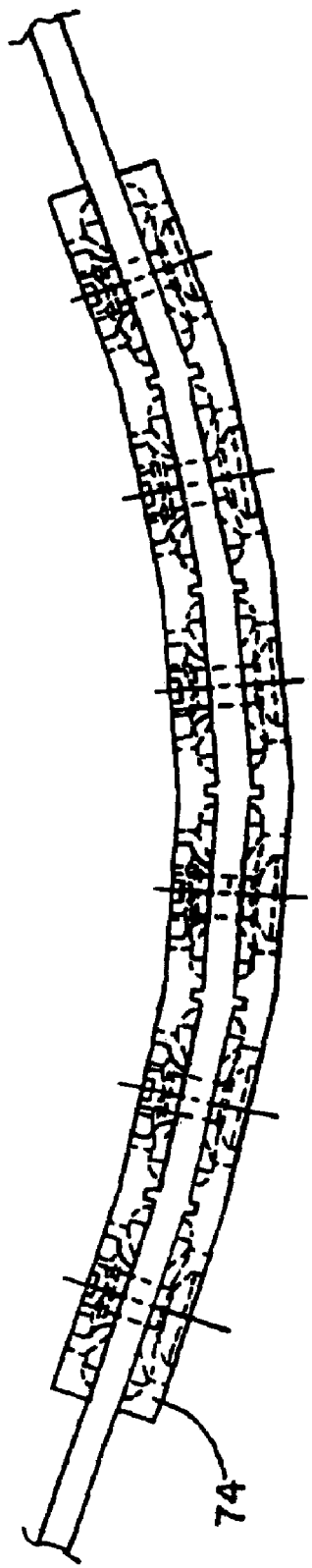

Because the portions 44 are of an elastomeric or rubber material, the splice formed with such anti-sifting rubber-coated plates 12 is still able to have the plates 12 reorient so that they are angled from a generally planar relationship with each other as when the belt 36 is in a troughed configuration at the sides thereof (see FIGS. 4B and 4D). In other words, even with the close spacing or abutment of the elastomeric portions 44 or if they are integral connecting portions as shown, the rubber material can flex so that adjacent plates can be angled in other than a planar relative orientation with respect to each other for belt troughing purposes. That is, outer plates 12 along the splice can be bent, angled or gradually curved upward relative to inner adjacent plates 12 at the points where such bending or curving of the troughed conveyor belt 36 occurs toward the sides thereof. Further, such laterally extending elastomeric portions 44 do not require that the sides 22, 24 of adjacent plates 12 be spaced unduly close to each other so as to require an excessive number of throughholes 46 be formed in the belt ends 38 for reducing the gap spacing between adjacent plates 12, as otherwise would be necessary without the elastomeric lateral portions 44, as described herein. In this manner, the strength of the belt 36 having the splice applied thereto is maintained the same as when the splice employs corresponding non-coated fastener plates.

Returning to the strip form of the plates 12, it is noted that the preferred and illustrated strip 10 of FIGS. 1 and 2 not only includes the lateral elastomeric portions 44, but also a layer 48 of rubber elastomeric material formed on and over the top of the plates 12. In this regard, the plates 12 molded in situ with the elastomeric material 14 can have the elastomeric layer 48 including the connecting portions 44 between adjacent plates formed integrally and simultaneously in the mold.

By having a continuous layer 48 of rubber material 14 extending across the entire strip 10 of the plates 12, there is a soft cushion against which cleaner blades, for instance, will engage when they encounter the splice using the present plate strip 10 herein. It has been found that the rubber-coated strip 10 generates far less blade chatter and significantly reduces damage to the conveyor belt 36 caused thereby adjacent to the splice. In this manner, the present rubber-coated plate strip 10 obviates the need to take out large portions of the belt 36 surrounding the spliced conveyor belt ends 38 when the splice thereat fails for forming a new belt splice. Further, the layer 48 of elastomeric material coated onto the top of the plates 12 extends the life of the fasteners 16 by reducing the hard impacts that the plates 12 of the fastener 16 will experience during conveyor belt operations as by engagement with the cleaner blades, conveyed materials and other conveyor components, as has been described. In addition, the rubber coating provides an extra layer of wear material on top of the plates 12 for protecting them against wear and ultimate failure to increase splice life.

An additional advantage of the rubber-coated strip 10 of plates 12 over the assignee's prior individually thin rubber-coated plates relates to their manufacture. In the present strip 10, the sides 22 and 24 of each of the plates 12 are substantially embedded in the rubber material 14, whereas in the prior individual rubber-coated fasteners their corresponding sides were only coated with a very thin film of rubber material from which excessive flashing generated by the molding process had to be removed. As is apparent, the individual cleaning of each of the upper plates is a very tedious and time-consuming process. In contrast, the present rubber-coated plate strip 10 substantially reduces the surface area from which flashing must be cleaned for the same number of fastener plates 12. In particular, no longer must flashing be cleaned off the sides 22 and 24 of the plates 12 as they are embedded in the rubber material.

As shown in FIG. 1, the rubber material 14 can be molded so that it generally follows the contour of the curved ends 26 and 28 of the plate 12 to provide outboard or leading and/or trailing edges 50 and 52 that extend in a substantially non-linear direction in the widthwise direction of the plates 12 and transverse to the travel direction of the conveyor belt 36 and thus transverse to the length of the typical straight-edge cleaning blades that scrape the surface of the belt 36 during conveyor belt operations. In this manner, the present strip 10 avoids blunt edge impacts with the fastener edges 50 or 52 that would otherwise increase the impact force between the blade and the fastener strip 10. As shown, this other than linear configuration can be a scalloped or wavy shape so that there are curved concave portions 54 that are recessed back from the curved convex projecting portions 56 with the recessed portions 54 aligned with the connecting portions 44 between the plates 12 and the projecting portions 56 aligned with the curved plate ends 26, 28. With skived belts, the edges 50, 52 can have a linear configuration normal to the belt width for abutting the generally vertical endwall formed in the skived groove at the conveyor belt end portion 38.

Referring to FIGS. 10 and 11, the upper plates 12 can be provided with an inclined or tapered lead-in portion 82 of rubber material 14 where the belts 36 are not skived. The taper of the lead-in portion 82 extends downwardly from the upper surface of the plates 12 and can extend down further than the plates 12 themselves as shown in FIG. 11 connected in the strip 10 toward the surface of the conveyor belt to which the plates 12 are clamped. These lead-in portions 82 are oriented to extend from the plates 12 in the travel direction of the belt 36 so as to minimize impact forces with conveyor belt cleaners and the like. In the strip 10, the lead-in portions 82 are integrally connected.

Grooves 84 in the material 14 can be provided on either side of each of the plates 12. The grooves 84 preferably extend lengthwise from adjacent the transition between the plate sides 22, 24 and the leading end 28 and into the lead-in portion 82. In the illustrated form, the grooves 84 have a diamond shape so that they are widest where the taper portion 82 begins. The grooves 84 provide take-up locations for the adjacent rubber material 14 when the strip 10 is installed with the lead-in portion 82 tightly engaged on the surface of the belt 36. Also, although shown as having a relatively long length and used with plates 12 having curved ends 28, it is anticipated that the lead-in portion 82 will perform well or even better if shortened in length and with plates 12 having a straight end edge to minimize the amount of rubber material 14 extending away from the plate ends.

The rubber material 14 itself can be selected to impart various desired properties thereto for the environment of conveyor belt operations. For instance, the rubber material 14 molded onto the plates 12 can have any one or combination of enhanced fire, electrostatic, oil, wear, and/or U.V. resistance imparted thereto. Additionally, the rubber 14 can be enhanced from a strength and wear standpoint such as by providing it with carcass material embedded therein similar to what can be used in the conveyor belts 36. In this regard, the thickness of the elastomeric layer 48 can be varied as needed to accommodate for such strength and wear-enhancing fibrous or carcass material keeping in mind the need to keep the profile low, particularly with belts that are not skived at their end portions 38.

Turning next to some exemplary dimensions for the rubber-coated plate strip 10, where six plates 12 are attached in a strip 10 as shown in FIGS. 1 and 2, the overall strip length can be 7.039 inches with the spacing between the center points of apertures 18, 20 of adjacent plates being approximately 1.173 inches. This side-to-side spacing of the plates 12 will correspond to the spacing of bottom plates 12a as set by the standard template used for these fasteners 16, as previously described. With the above spacing, the end plates 12 in the strip 10 can have rubber material 14 extending beyond the respective sides 22, 24 thereof such that the spacing between the center point of their apertures 18, 20 and parallel sides 58 and 60 of the rubber 14 in the strip 10 is approximately 0.587 inch. The sides 58 and 60 interconnect the outboard edges 50 and 52 of the strip. The thickness of the rubber layer 48 without embedded carcass material, for example, can be approximately 0.218 inch.

Figure 3:
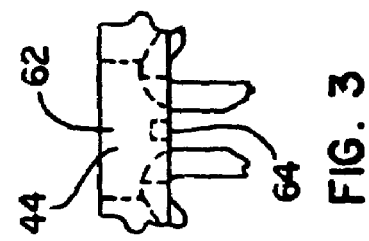
FIG. 3 is an enlarged view taken from FIG. 2 showing a cutting groove formed between two adjacent plates.

Referring next to FIG. 3, it can be seen that the connecting portions 44 in the fastener strip 10 are provided with thinned areas 62 as by a thin linear channel or groove 64 formed therein. These thinned areas 62 and groove 64 serve as cutting areas with the groove 64 guiding a cutting implement therein to allow an installer to reduce the number of plates 12 in a strip 10, as may be needed. As shown, the groove 64 is formed on the underside of the rubber layer 48 between each adjacent plate 12. In the illustrated strip having the exemplary dimensions set forth above, the groove 64 can have a depth of 0.063 inch and a width of 0.063 inch.

A further advantage of the groove 64 relates to the installation of the fasteners 16. When nuts 66 are tightened down onto the protruding bolt ends 40, the grooves 64 allow the rubber material 14 to stretch or contract acting as a type of hinge or pivot point between the plates 12 so as to provide a take-up or relief point between adjacent plates 12 as they are clamped down onto the upper surface of belt end portions 38. Optionally, the strip 10 or 72 (discussed hereinafter) can include chamfered or beveled corners 69 to minimize the size or profile of any projecting portions of elastomeric material 14 when the strip 10 of plates 12 or plates 12a is clamped down onto the belts 36 and installed thereon.

Referring next to FIGS. 4A–4D, the fasteners 16 can also employ elastomeric material 68 associated with the bottom plates 12a thereof in much the same manner as previously described with the upper plates 12. To this end, the elastomeric or rubber material 68 may consist primarily of laterally extending portions 70 either formed on individual plates 12a (FIGS. 4C and 4D), or they can be integral with lateral portions 70 of adjacent plates so as to form connecting portions between each of the plates 12a for connecting them in a strip 72 of lower plates 12a. In this regard, the lower plates 12a can be molded in situ so that there is a layer 74 of the elastomeric material 68 that extends across the top of the plates 12a (that is, the plate surface facing away from the belt 36) and which extends across and between the adjacent plates 12a via the connecting portions, as shown in FIGS. 4A, 4B, 8 and 9. In this instance, the strips 10 and 72 of upper and lower plates 12a and 12b cooperate to form a double seal against sifting of conveyed material from the upper surface of the belts down and past the lower plates 12a to the underside of the conveyor belt 34. By having a layer 74 extending on the lower plates 12a and either interconnecting them in a strip 72 or having the plates 12a separate from each other in their individual form, the rubber-coated plates 12a will lower the impact forces generated by the engagement of the splice with the conveyor belt rollers, other conveyor components, and conveyor structure reducing wear of both the fastener plates 12a and the rollers. Further, this cushioning of the impact forces with the rollers, other conveyor components, and conveyor structure will quiet conveyor belt operations significantly.

It is also advantageous to have the elastic material 68 simply employed in the corresponding apertures 18a and 20a of the lower plates 12a for holding bolt heads 76 substantially fixed therein. In this manner, the prior clips or washers shown in FIGS. 5–7 no longer need to be utilized to preassemble the bolts 42 to the lower plates 12a. Instead, the rubber material 68 disposed in the apertures 18a and 20a will be sufficient to tightly hold the bolt heads 76 therein. In situ molding of the bolts 42 to the lower plates 12a should save substantial time and expense in the preassembly of the bolts 42 to the plates 12a over previous procedures used for this purpose.

While described as having the elastomeric material 68 only molded into the apertures 118a and 20a, manifestly with the previously described forms of the rubberized lower plates 12a either individually or in strip form, such deposit of rubber material 14 in the plate apertures 18a and 20a can inherently take place in forming the coating of the rubber onto the plates 12a. With rubber material 68 holding the bolt heads 76 in the apertures 18a and 20a, there is a lesser likelihood of the heads 76 turning in their respective apertures 18a and 20a when the nuts 66 are tightened down into the corresponding apertures 18 and 20 of the upper plates 12. In other words, the elastomeric material 68 will better adhere the bolt heads 76 via the diametrically opposite slots 78 thereof to the opposing anti-rotation nubs 80 formed on the lower plates 12a and projecting into the apertures 18a and 20a. Alternatively, the formation of the slots 78 and nubs 80 can be reversed to be on the plates 12a and bolt heads 76, respectively. In the prior fasteners such as shown in FIG. 5, despite the presence of the anti-rotation slots 78 and nubs 80, tightening of the nuts 66 sometimes cause the bolt head 76 to shift so that they are not seated in the apertures 18a and 20a such that the slots 78 no longer are in registery with the nubs 80. This allows turning of the bolt heads 76 in the apertures 18a and 20a so that the clamping force of the plates 12 and 12a against the upper and lower surfaces of the belt end portion 38 will not be as great as otherwise possible. Thus, by addition of the elastomeric material 68, it is anticipated that the heads 76 will be effectively adhered to the anti-rotation nubs 80 so as to prevent their turning in the apertures 18a and 20a and displacement out therefrom allowing the clamping force on the belt surfaces by the plates 12 and 12a to be maximized with the fasteners 16 herein.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A strip of conveyor belt fasteners that remain connected during operations of a conveyor belt system with the conveyor belt having a troughed configuration, the conveyor belt fastener strip comprising:
   a plurality of plates of metallic material for being attached onto an end of a conveyor belt; and
   elastomeric connecting portions of elastomeric material extending between and connecting adjacent plates in the fastener strip and configured to allow the plates to reorient to be angled upwardly from a generally planar orientation relative to each other via resilient flexing of the elastomeric material of the connecting portions during troughing of the conveyor belt and to substantially obviate trapping or sifting of conveyed material between the plates,
   wherein the elastomeric connecting portions include gaps facing the conveyor belt to allow for pivoting of adjacent connected plates relative to each other via stretching or contracting of the elastomeric material of the elastomeric connecting portions.

2. The conveyor belt fastener strip of claim 1 wherein the plates are upper plates of solid plate fasteners that are sized to extend across a pair of belt ends to be spliced together, and recessed apertures at each end of the plates for receiving attachment members that extend through the belt.

3. The conveyor belt fastener strip of claim 1 including an elastomeric layer on top of the plates integral with the connecting portions so that belt cleaners engage the elastomeric layer during the conveyor belt operations minimizing chatter thereof and damage to the belt caused thereby.

4. The conveyor belt fastener strip of claim 3 wherein the layer and connecting portions are of a predetermined elastomeric material selected to provide at least one of enhanced fire, oil, U.V. and electrostatic resistance to the material.

5. The conveyor belt fastener strip of claim 1 wherein the plates are upper plates of solid plate fasteners for being positioned on an upper surface of the belt and having lower plates separate therefrom for being engaged against a lower surface of the belt end, and the connecting portions between the upper plates allows the plurality of plates to be positioned simultaneously on the upper surface of the belt for attachment thereto for minimizing installation time.

6. The conveyor belt fastener strip of claim 5 wherein the upper and lower plates have apertures for being aligned to receive attachment members extending through the belt, and
elastomeric material in the lower plate apertures to keep the attachment member substantially fixed therein.

7. The conveyor belt fastener strip of claim 6 wherein the attachment members are bolts having an enlarged head seated in the lower plate aperture with the elastomeric material securing the head therein.

8. The conveyor belt fastener strip of claim 1 wherein the plates have at least one end attached onto the belt end, and
elastomeric material extending around the ends of the plates to form a leading or trailing edge of the strip with the edge having a predetermined configuration that is other than linear transverse to a direction of belt travel to avoid blunt edge impacts with a belt cleaner.

9. The conveyor belt fastener strip of claim 1 wherein the plates including a leading end, and
a lead-in portion of elastomeric material that is tapered to extend from the leading end of the plates down toward the belt to minimize impact forces with a belt cleaner.

10. The conveyor belt fastener strip of claim 9 wherein the lead-in portion includes grooves to provide take-up locations for the elastomeric material with the strip installed on a belt end and the lead-in portion substantially engaged therewith.

11. The conveyor belt fastener strip of claim 1 wherein the connecting portions lack metal material therein and have substantially linearly extending thinned areas to allow cutting therealong through the elastomeric material for reducing the number of plates in a strip.

12. The conveyor belt fastener strip of claim 1 wherein the plates each have a first belt facing surface and second surface facing away from the belt, and the elastomeric connecting portions have first and second elastomeric surfaces corresponding to the first and second plate surfaces with the second elastomeric surface corresponding to the plate second surface not being recessed therefrom to avoid providing areas for collection of conveyed material on the second elastomeric surface.

13. The conveyor belt fastener strip of claim 1 wherein each of the plates extend in a lengthwise direction on the belt transverse to the belt end, and the gaps comprise grooves extending between the plates in the lengthwise direction.

14. The conveyor belt fastener strip of claim 1 wherein the plates include leading ends that have elastomeric material thereon, and the elastomeric connecting portions are configured to be recessed back toward the belt end from the leading ends of the plates, and
a gap spacing between the plates so that the elastomeric connecting portions lack metallic material therein.

15. The conveyor belt fastener strip of claim 1 wherein the elastomeric connecting portions are formed only with elastomeric material.

16. A strip of conveyor belt fasteners that remain connected during operations of a conveyor belt system with the conveyor belt having a troughed configuration, the conveyor belt fastener strip comprising:
a plurality of plates of metallic material for being attached onto an end of a conveyor belt; and
elastomeric connecting portions of elastomeric material extending between and connecting adjacent plates in the fastener strip and configured to allow the plates to reorient to be angled upwardly from a generally planar orientation relative to each other via resilient flexing of the elastomeric material of the connecting portions during troughing of the conveyor belt and to substantially obviate trapping or sifting of conveyed material between the plates,
wherein the connecting portions lack metal material therein and have substantially linearly extending thinned areas to allow cutting therealong through the elastomeric material for reducing the number of plates in a strip, the elastomeric connecting portions include gaps facing the conveyor belt to allow for pivoting of adjacent connected plates relative to each other, and the gaps comprise grooves that extend linearly and are aligned with the thinned areas in the connecting portions.

* * * * *